US007068743B1

(12) United States Patent
Suzuki

(10) Patent No.: US 7,068,743 B1
(45) Date of Patent: Jun. 27, 2006

(54) DS-CDMA MULTI-USER INTERFERENCE CANCELLER AND CDMA MULTI-USER SYSTEM USING THE SAME

(75) Inventor: Hideto Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/464,167

(22) Filed: Dec. 16, 1999

(30) Foreign Application Priority Data

Dec. 17, 1998 (JP) .................................. 10-359172

(51) Int. Cl.
    *H04L 27/08* (2006.01)
(52) U.S. Cl. ...................... 375/345; 370/335; 370/342; 375/346; 375/285; 375/144; 375/148; 455/245.1
(58) Field of Classification Search ................ 375/144, 375/134, 136, 137, 148, 224, 227, 285, 345, 375/346, 350; 455/63, 232.1, 234.1, 245.1, 455/250.1, 296
    See application file for complete search history.

(56) References Cited

U.S. PATENT DOCUMENTS

| 5,369,792 A | * | 11/1994 | Matsumoto et al. ..... 455/245.1 |
| 5,513,386 A | * | 4/1996 | Ogino et al. .............. 455/234.1 |
| 5,579,304 A | * | 11/1996 | Sugimoto et al. ........... 370/342 |
| 5,579,319 A | * | 11/1996 | Daniel ......................... 370/337 |
| 5,646,964 A | * | 7/1997 | Ushirokawa et al. ........ 375/346 |
| 5,745,531 A | * | 4/1998 | Sawahashi et al. .......... 375/345 |
| 5,758,271 A | * | 5/1998 | Rich et al. ................ 455/234.1 |
| 5,901,185 A | * | 5/1999 | Hassan ....................... 375/346 |
| 5,909,645 A | * | 6/1999 | Abramsky et al. ........ 455/249.1 |
| 6,044,253 A | * | 3/2000 | Tsumura ................... 455/234.1 |
| 6,052,566 A | * | 4/2000 | Abramsky et al. ........ 455/67.11 |
| 6,311,047 B1 | * | 10/2001 | Gotou ....................... 455/234.1 |
| 6,314,144 B1 | * | 11/2001 | Moriyama et al. .......... 375/316 |
| 6,324,387 B1 | * | 11/2001 | Kamgar et al. ........... 455/234.1 |
| 6,473,451 B1 | * | 10/2002 | Seki et al. ................... 375/142 |
| 6,665,286 B1 | * | 12/2003 | Maruta et al. .............. 370/342 |

FOREIGN PATENT DOCUMENTS

| EP | 0 776 105 A1 | 5/1997 |
| EP | 0 923 199 A2 | 6/1999 |
| JP | 09-238094 | 9/1997 |
| JP | 2737776 | 1/1998 |
| JP | 10-247894 | 9/1998 |

OTHER PUBLICATIONS

Japanese translation of Korean Office Action (with English translation of relevant portion).

* cited by examiner

*Primary Examiner*—Jean B. Corrielus
(74) *Attorney, Agent, or Firm*—Dickstein, Shapiro, Morin & Oshinsky, LLP.

(57) ABSTRACT

A DS-CDMA (Direct Sequence-Code Division Multiple Access) multi-user interference canceller cancels interference waves of a plurality of users. The DS-CDMA includes a variable gain controller for comparing reception characteristics of reception signals received from the plurality of users prior to interference cancellation processing with reception characteristics upon the interference cancellation processing and evaluating a comparison result, and controlling gains prior to baseband decoding of the reception signals so as to maximize improvements of the reception characteristics of the reception signals on the basis of an evaluation result. A CDMA multi-user system using the above canceller is also disclosed.

6 Claims, 6 Drawing Sheets

DS-CDMA MULTI-USER INTERFERENCE CANCELLER AND CDMA MULTI-USER SYSTEM USING THE SAME

BACKGROUND OF THE INVENTION

1. Field of the Invention

The present invention relates to a multi-user interference canceller and a CDMA (Code Division Multiple Access) multi-user system in a DS-CDMA (Direct Sequence-Code Division Multiple Access) communication scheme and, more particularly, an improvement of a multi-user interference canceller characterized by the signal level of a reception signal, and a CDMA multi-user system using the same.

2. Description of the Prior Art

A multi-user interference canceller has been proposed as a method of reducing the inter- and intra-microcell interferences in a spreading spectrum multiple access (DS-CDMA), increasing the subscriber capacity, and improving speech communication quality.

Prior to demodulation of a signal from a given user k ($1 \leq k \leq K$), this multi-user interference canceller generates and subtracts interference replicas of users except the user k I times (multistage) to reduce the influences of interferences from other users. The multi-user interference canceller schemes are classified into serial and parallel schemes.

The principle of the serial scheme is described in, e.g., IECE Technical Report (RCS95-50) "Sequential Channel Inference Type Serial Cancellar using a pilot symbol in DS-CDMA" or Japanese Unexamined Patent Publication No. 09-270736 (Japanese Patent No. 2737776) "DS-CDMA Multi-User Serial Interference Canceller".

FIGS. 1 and 2 show the arrangement of an interference canceller (parallel type) described in Japanese Patent No. 2737776. This example is a 3-user canceller.

FIG. 1 is a schematic block diagram of a receiver described in this prior art and having a general DS-CDMA communication scheme. Referring to FIG. 1, an antenna 41 receives radio waves, and an RF amplifier 42 amplifies an RF signal. A variable gain amplifier 43 sets the output level of the RF signal constant. A frequency converter 44 detects a baseband signal, and an A/D converter 45 converts the baseband signal into a digital signal. An interference canceller/demodulator unit 46 cancels an interference wave from the digital signal to demodulate the original transmission data. In a negative feedback loop, a level detector 47 converts the level of the baseband signal into a DC voltage as an average or peak level of the levels accumulated for a predetermined period of time. An AGC controller 48 controls the gain of the variable gain amplifier 43 in accordance with the DC voltage to set the output level of the variable gain amplifier 43 constant.

Referring to FIG. 2, reference numeral 51 denotes a baseband reception signal demodulated by the former-stage RF demodulator and A/D-converted; 52, an ICU (Interference Canceller Unit) for generating and cancelling interference replicas; 53, an adder for adding the interference replica components of all users; 54, a delay memory for delaying and holding reception signals; 55, a subtracter for subtracting (cancelling) the interference replica components from the reception signals; 56, a line for transmitting the interference replica signal of a given user to the next stage of the given user; 57, an adder for adding the (interference) replica signal of the previous stage of the given user again (the signal components of the first stage of all users are already subtracted); and 58, a decoder for outputting a final decoded signal.

With the above arrangement, replica signals S1,1, S1,2, and S1,3 of the first to third users of the first stage are reconstructed from a reception signal r by the parallel-connected ICUs 52. The adder 53 adds these replica signals. The subtracter 55 subtracts the sum signal from the adder 53 from the original reception signal r. Before the outputs from the subtracter 55 are input to the ICUs 52 of the second stage, the signal components of the respective users are added by the adders 57. The outputs from the adders 57 are input to the ICUs 52 of the second stage, respectively. That is, an output $A'_i$ from the ith stage subtracter 55 is generally given as follows:

$$A'_i = r - S_{i-1,1} - S_{i-1,2} - \ldots - S_{i-1,(k-1)} - S_{(i-1),k} - S_{(i-1),(k+1)} - \ldots - S_{(i-1),K} \tag{1}$$

As can be apparent from equation (1), the output $A'_i$ is a residual signal from which the components of all users including the component of a given user $S_{(i-1),k}$ are subtracted. Prior to processing for k users of the ith stage, signals $S_{(i-1),k}$, i.e., the replicas of the users which are obtained in the previous stage are added by the corresponding adders 57 again and input to the corresponding ICUs 52. All these signals are chip rate signals. In the prior art of Japanese Patent No. 2737776, the memory amounts for compensating the processing delays increase in the subsequent stages. According to the above technique, however, the memory for holding reception signals can be reduced, and the apparatus can be easily implemented.

FIG. 3 is a block diagram showing the internal arrangement of the ICU 52 in the conventional scheme described in Japanese Patent No. 2737776. A multiplier 62 multiplies an input reception signal $61(r_{(t)})$ with a spread code $Ck_{(t)}$ of the path of the given user. Outputs from the multiplier 62 are integrated by an integrator 63 to obtain a correction detection signal. A transmission path estimator 64 obtains a transmission line fading vector $\xi$ from the correction detection signal. A multiplier 65 multiplies a complex conjugate $\xi^*$ with the correction detection signal to correct the phase. The phase-corrected signals of the paths of the respective transmission lines are combined by a RAKE combiner 66, and a discriminator 67 decodes an original symbol sequence. To reconstruct the interference replicas, the decoded sequence is multiplied with the transmission line fading vectors of the respective path (multiplier 68) to restore the original transmission line characteristics. A multiplier 69 spreads an output from the multiplier 68 using the original spreading sequence to reconstruct the interference replica of the chip rate. An output from the multiplier 69 is transferred to the next user or stage.

In the last stage, the interference-cancelled signal is input to the decoder 58. A final decoding result is then output.

The above processing is generally digital signal processing. In processing from the input to the antenna to the input to the interference canceller, a radio reception signal input from the antenna is RF-amplified, frequency-converted, and A/D-converted. In order to convert the reception signal into a digital signal at an appropriate level, the reception signal of appropriate level must be input to the A/D converter.

For this purpose, in processing between the RF amplifier and the A/D converter, the variable gain amplifier must be arranged. In addition, an AGC (Automatic Gain Controller) must be arranged to automatically adjust the gain of the variable gain amplifier so as to monitor the input to the A/D converter and set the input level to the A/D converter almost constant.

In this interference canceller, the operation of estimating and reconstructing the interference replica from the reception signal and subtracting the interference replica from the reception signal is performed in the digital form. The operation accuracy greatly influences the characteristics of the interference canceller. To improve operation accuracy, the number of bits assigned to express the reception signal must be maximized.

Assume that digital signal processing operation for interference cancellation requires 8 bits. It is better to express the reception signal using 8 bits than to express it using a smaller number of bits because the quantization error can be reduced, and quantization accuracy can increase.

When an excessively large number of bits are assigned to the reception signal, bit overflow (the calculated value exceeds the number of bits which can be digitally expressed, and a correct value cannot be expressed) occurs in the operation process. This may degrade the interference cancellation characteristics.

In the interference canceller, not only the reception quality of a signal of interest but also the reception quality of the interference wave itself is important to perform faithful interference cancellation in accordance with its principle of operation. Assume that the difference is present between the reception wave of interest and the interference wave. In this case, when AGC control is simply performed so as to optimize only the reception characteristics of the reception characteristics of the wave of interest, the level of the interference wave becomes excessively low, the number of bits assigned to the reception wave of interest decreases, and a sufficient operational accuracy cannot be assured. This degrades the accuracy of the reconstructed interference replica. As a result, the reception characteristics upon interference cancellation cannot be improved.

The input to the A/D converter must be controlled so as to determine bit assignment for minimizing the degradation of the total characteristics by the operation errors in the above processing.

In the prior art described above, the signal level prior to A/D conversion is simply detected, and AGC control prior to A/D conversion is performed in accordance with the magnitude of the detected level. The following control methods for the above operation are available: a method of keeping the average level constant; a method of suppressing the peak level to a predetermined level; and a method of inhibiting a change in gain with an AGC control hysteresis until a change in level to some extent occurs. Either method controls the level prior to A/D conversion. Therefore, optimal reception characteristics are not always obtained under various conditions described above.

SUMMARY OF THE INVENTION

The present invention has been made in consideration of the above situations in the prior arts, and has as its object to provide a multi-user interference canceller in a DS-CDMA communication scheme and a CDMA multi-user system using this canceller, in which an AGC (Automatic Gain Control) control method of controlling the A/D converter input levels of reception signals received from a plurality of users is implemented to prevent degradation of the reception characteristics upon interference cancellation processing.

In order to achieve the above object according to the first aspect of the present invention, there is provided a DS-CDMA (Direct Sequence-Code Division Multiple Access) multi-user interference canceller for cancelling interference waves of a plurality of users, comprising a variable gain controller for comparing reception characteristics of reception signals received from the plurality of users prior to interference cancellation processing with reception characteristics upon the interference cancellation processing and evaluating a comparison result, and controlling gains prior to baseband decoding of the reception signals so as to maximize improvements of the reception characteristics of the reception signals on the basis of an evaluation result.

More specifically, in addition to the variable gain amplifier, the DS-CDMA multi-user interference canceller of the first aspect comprises a preliminary demodulation section for obtaining, in advance, the reception characteristics of the reception signals received from the plurality of users prior to the interference cancellation processing and notifying respective subsequent interference cancellation stages of the obtained data, a section for measuring and obtaining the reception characteristics of the reception signals for the respective interference cancellation stages upon the interference cancellation processing, a section for comparing the reception characteristics of the respective interference cancellation stages upon the interference cancellation processing with the reception characteristics prior to the interference cancellation processing, and a reception quality collection section for collecting comparison results from all the interference cancellation stages. When the interference canceller determines that the degree of improvement of the reception characteristics is low, a control signal is so generated as to correct the current gain to the AGC.

In order to achieve the above object according to the second aspect of the present invention, there is provided a CDMA (Code Division Multiple Access) multi-user system for cancelling interference waves of a plurality of users to obtain a plurality of demodulated signals, comprising comparing a variable gain controller for comparing reception characteristics of reception signals received from the plurality of users prior to interference cancellation processing with reception characteristics upon the interference cancellation processing and evaluating a comparison result, and controlling gains prior to baseband decoding of the reception signals so as to maximize improvements of the reception characteristics of the reception signals on the basis of an evaluation result.

In comparison control of the reception characteristics described above, the characteristics (SN (Signal-to-Noise) ratio or Eb/Nb (energy per signal it/noise power spectrum density) and/or BER (Bit Error Rate)) of the reception signals measured by the preliminary demodulation section are compared with the reception characteristics upon the interference cancellation processing. The degree of improvement of the reception characteristics is monitored in accordance with the comparison result. If the degree of improvement is determined to be low, a signal for instructing to correct the level of the reception signal is output to the AGC.

The above series of operations optimizes bit assignment to the reception signal upon A/D conversion. This prevents degradation of the reception characteristics.

The above and many other objects, features and advantages of the present invention will become manifest to those skilled in the art upon making reference to the following detailed description and accompanying drawings in which preferred embodiments incorporating the principle of the present invention are shown by way of illustrative examples.

DETAILED DESCRIPTION OF THE PREFERRED EMBODIMENT

A preferred embodiment according to the present invention will be described in detail with reference to the accompanying drawings (FIGS. 4 and 5) hereinafter. The present invention is not limited to the following embodiment. Changes and modifications may be made within the spirit and scope of the present invention.

Figure 4:
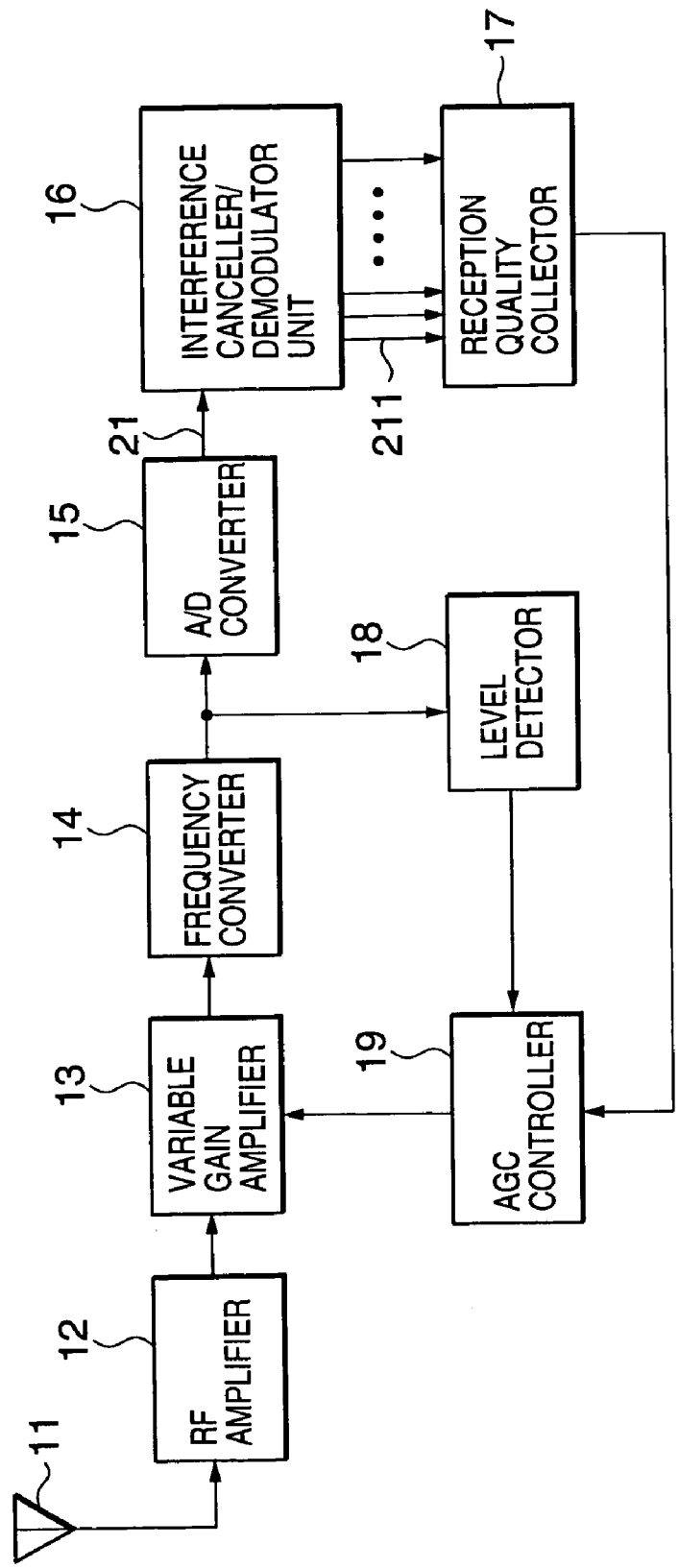
FIG. 4 is a block diagram showing the arrangement of a multi-user interference canceller according to an embodiment of the present invention.

FIG. 4 is a schematic block diagram showing the overall arrangement of a multi-user serial interference canceller according to an embodiment of the present invention. A radio reception signal spread with a spread code is input to an antenna 11 and then to a variable gain amplifier 13 via an RF amplifier 12. The level of the reception signal is converted into an appropriate level. A frequency converter 14 converts the reception signal into a baseband signal. The baseband signal is input to an A/D converter 15. The reception signal converted into a baseband digital signal by the A/D converter 15 is input to an interference canceller/demodulator unit 16. A level detector 18 detects the level of the signal prior to the input to the A/D converter 15. A feedback signal is input to an AGC controller 19. A reception quality collector 17 collects the reception quality of the interference canceller/demodulator unit 16 on the basis of this embodiment. The collection result is input to the AGC controller 19 for feedback control.

Figure 1:
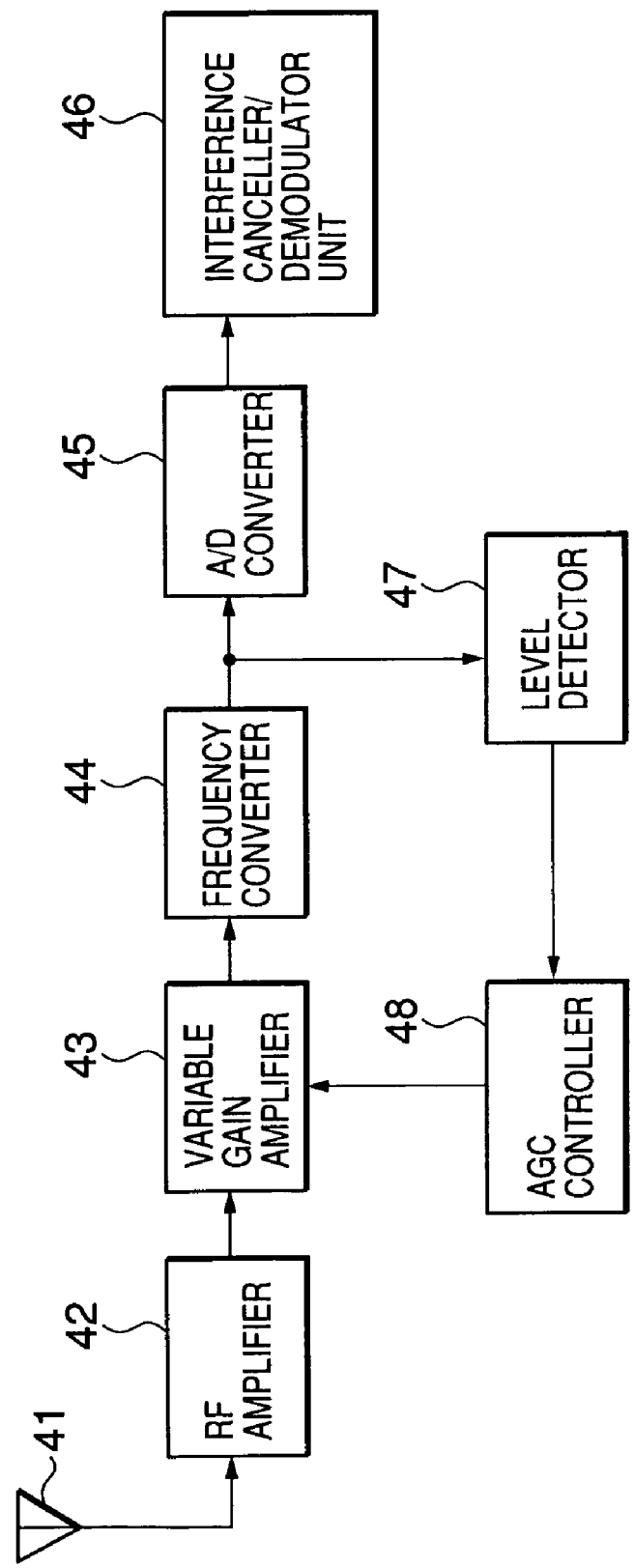
FIG. 1 is a block diagram showing the arrangement of a conventional multi-user interference canceller.
Figure 2:
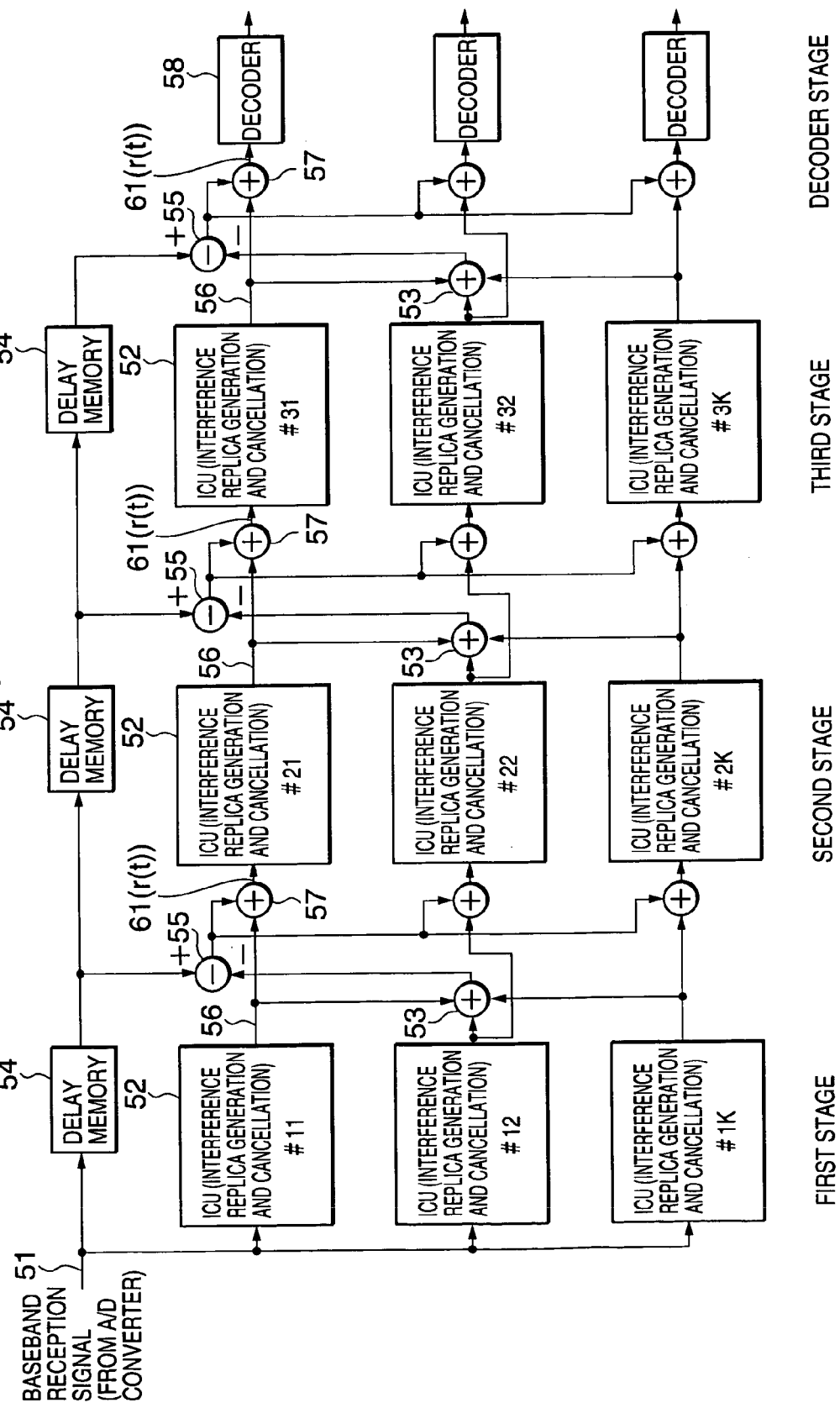
FIG. 2 is a block diagram showing the arrangement of an interference canceller/demodulator unit in the conventional multi-user interference canceller.
Figure 3:
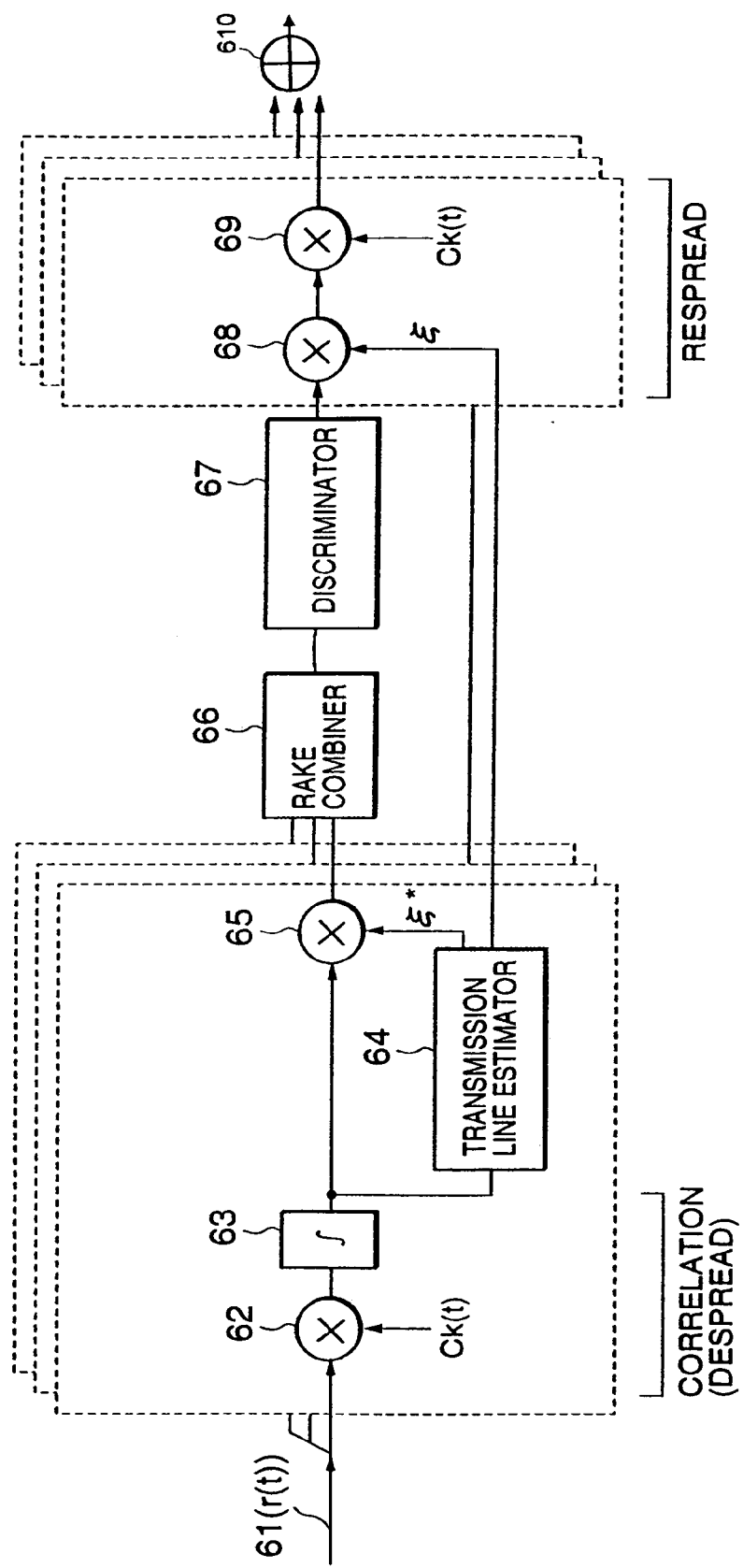
FIG. 3 is a block diagram showing the arrangement of an ICU (Interference Canceller Unit) in the conventional multi-user interference canceller.
Figure 5:
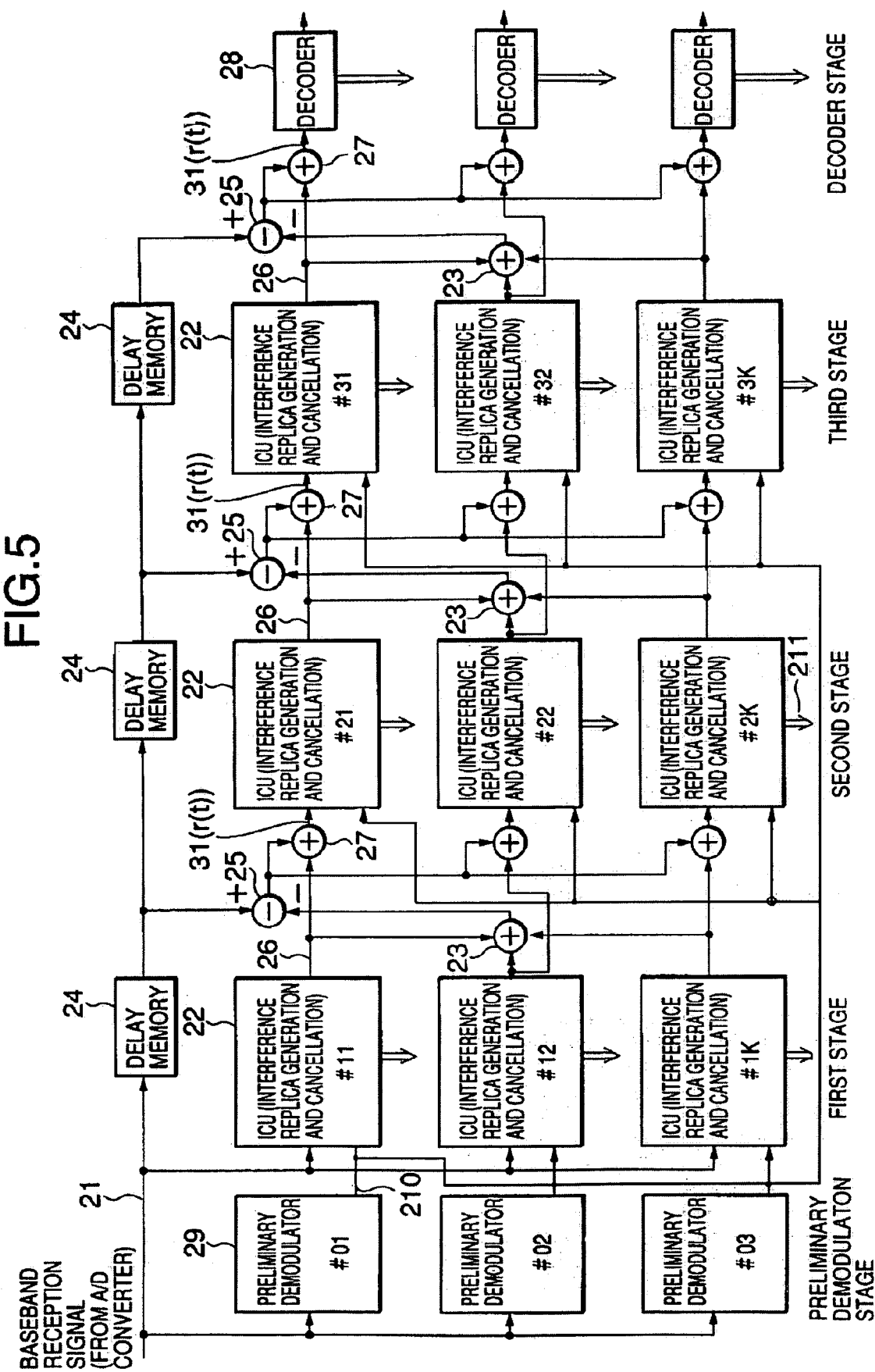
FIG. 5 is a block diagram showing the arrangement of an interference canceller/demodulator unit in the multi-user interference canceller according to the present invention.

FIG. 5 is a detailed block diagram showing the main part of the interference canceller/demodulator unit 16 of this embodiment. The multi-user interference canceller in FIG. 5 has the main part identical to that shown in FIG. 2. Reference numeral 21 denotes a baseband reception signal demodulated by the former-stage RF demodulator and A/D-converter; 22, an ICU (Interference Canceller Unit) for generating and cancelling interference replicas; 23, an adder for adding the interference replica components of all users; 24, a delay memory for delaying and holding reception signals; 25, a subtractor for subtracting (cancelling) the interference replica components from the reception signals; 26, a line for transmitting the interference replica signal of a given user to the next stage of the given user; 27, an adder for adding the (interference) replica signal of the previous stage of the given user again (the signal components of the first stage of all users are already subtracted); and 28, a decoder for outputting a final decoded signal. The operations and functions of the respective units except units 22 (as further described below with respect to FIG. 6) in the above arrangement are the same as those described with reference to FIG. 2, and a detailed description thereof will be omitted.

Replica signals S1,1, S1,2, and S1,3 of the first to third users of the first stage are reconstructed from a reception signal r by the parallel-connected ICUs 22. The adder 23 adds these replica signals. The subtracter 25 subtracts the sum signal from the adder 23 from the original reception signal r. Before the outputs from the subtracter 25 are input to the ICUs 22 of the second stage, the signal components of the respective users are added by the adders 27. The outputs from the adders 27 are input to the ICUs 22 of the second stage, respectively. That is, an output $A_i$ from the ith stage subtracter 25 is generally given as follows:

$$A_i = r - S_{i-1,1} - S_{i-1,2} - \ldots - S_{i-1,(k-1)} - S_{(i-1),k} - S_{(i-1),(k+1)} - \ldots - S_{(i-1),K} \quad (2)$$

As can be apparent from equation (2), the output $A'_i$ is a residual signal from which the components of all users including the component of a given user $S_{(i-1),k}$ are subtracted. Prior to processing for k users of the ith stage, signals $S_{(i-1)\ k}$, i.e., the replicas of the users which are obtained in the previous stage are added by the corresponding adders 27 again and input to the corresponding ICUs 22. All these signals are chip rate signals.

In the prior art of Japanese Patent No. 2737776, the memory amounts for compensating the processing delays increase in the subsequent stages. According to the present invention, however, the memory for holding reception signals can be reduced, and the apparatus can be easily implemented.

The reception signals converted into the baseband digital signals are input to a preliminary demodulation stage. This preliminary demodulation stage has parallel-connected preliminary demodulators 29 equal in number to the number of users (three users in this embodiment). This stage obtains the reception characteristics of the reception signals received from the users prior to interference cancellation processing. The preliminary demodulation stage then notifies the subsequent interference cancellation stage of obtained reception characteristic data 210. The cancellation stage (3-stage arrangement in this embodiment) performs interference cancellation later. A decoder stage finally decodes the interference-cancelled data and outputs the original data sequence. The cancellation stage having canceller units equal in number to the number of users (three users) and decoder stage having decoders equal in number to the number of users (three users) are cascade-connected to the preliminary demodulation stage. The reception quality collector 17 is notified of outputs 211 from the ICUs 22 as control signals.

Figure 6:
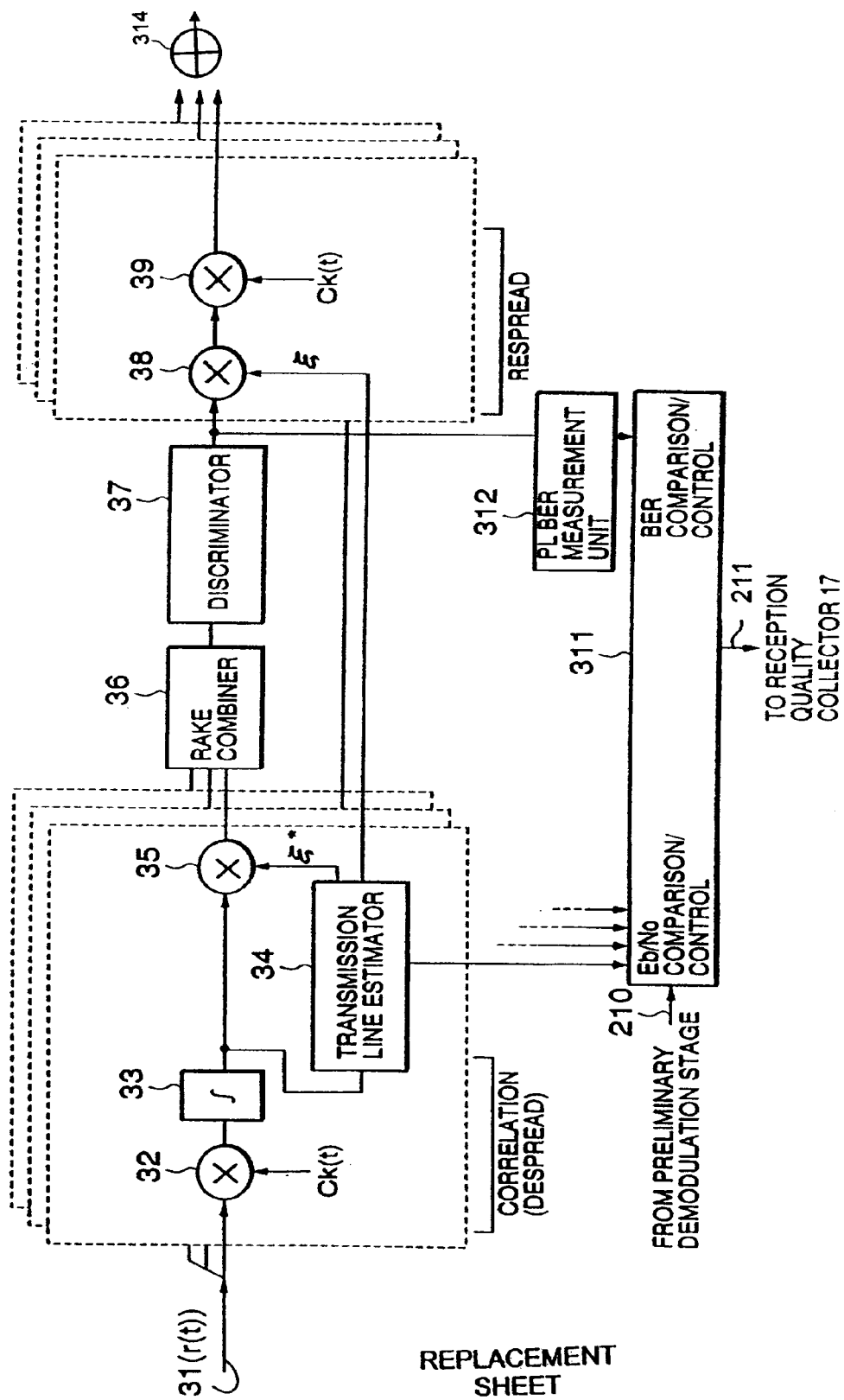
FIG. 6 is a block diagram showing the arrangement of an ICU in the multi-user interference canceller according to the present invention.

Referring to FIG. 6, each ICU 22 in FIG. 5 is arranged as follows. A reception signal inputted is a baseband reception signal 21 for the first stage. The reception signals for the second and subsequent stages are output reception signals 31 ($r_{(t)}$) from the adders 27 of the previous stages. Each ICU 22 is comprised of a multiplier 32, integrator 33, transmission line estimator 34, multiplier 35, RAKE combiner 36, discriminator 37, multiplier 38, and respreader 39. The multiplier 32 despreads the input with a spread code $Ck_{(t)}$. The integrator 33 integrates outputs from the multiplier 32 to calculate the correlation. The transmission line estimator 34 extracts the transmission line characteristics of a despread signal. The multiplier 35 multiplies an output from the integrator 33 with the complex conjugate of the transmission line characteristics. The RAKE combiner 36 combines the signals of the paths. The discriminator 37 discriminates the output from the RAKE combiner 36. The multiplier 38 adds the transmission line characteristics to the output from the discriminator 37 again. The respreader 39 respreads the output from the multiplier 38 with the spread code $Ck_{(t)}$ again and outputs the result to the next stage. Note that the transmission line estimator 34 also measures the Eb/No.

A reception characteristic comparison controller 311 receives Eb/No information measured by the transmission line estimator 34. The reception characteristic comparison controller 311 compares the Eb/No value measured by the transmission line estimator 34 with an Eb/No value (reception characteristic data) 210 measured and sent by the preliminary demodulation stage. As a result of comparison, if it is determined that the characteristics are not greatly improved upon the interference cancellation processing, a control signal 211 is output.

After the reception quality collector 17 detects the overall characteristics via the control signal lines 211, the control signal 313 is finally input to the AGC controller (19 in FIG. 4) to control the input level of the A/D converter (15 in FIG. 4) to an optimal value (the input level is slightly increased or decreased).

The RAKE combiner and the like in FIG. 5 are known well to those skilled in the art and can be applied to this embodiment as well.

The operation of this embodiment will now be described below.

Referring to FIG. 4, the RF amplifier 12 amplifies an RF reception signal input from the antenna 11. The frequency converter 14 converts the reception signal into a baseband reception signal via the variable gain amplifier 13. The A/D converter 15 then converts the reception signal into a digital reception signal. The digital reception signal is input to the preliminary demodulation stage of the interference canceller/demodulator unit 16. The level detector 18 detects the level (peak) of the reception signal, and the AGC controller 19 generates a control signal corresponding to the level (peak) of the reception signal. The control signal is input to the variable gain amplifier 13 to prevent the peak clipping due to an excessive input to the variable gain amplifier 13 and subsequent units or prevent degradation of S/N ratio due to excessive small input. A control signal from the reception quality collector 17 serving as the characteristic feature of the present invention is input to the AGC controller 19, as will be described later.

Referring to FIG. 5, each preliminary demodulator 29 in the preliminary demodulation stage performs preliminary demodulation to obtain reception characteristics such as an Eb/No, BER (Bit Error Rate), and the like required in the subsequent interference cancellation stage. The obtained reception characteristic data are sent to the next interference cancellation stage and input to the ICU (interference replica generation and cancellation) 22 of each user. An arbitrary method can be used to send the reception characteristic data to the subsequent stage. For example, the data may be time-divisionally multiplied with the reception signal, or other lines may be arranged to send the reception characteristic data.

Referring to FIG. 6, each ICU 22 in FIG. 5 performs the following processing. The multiplier 32 multiplies the spread code $Ck_{(t)}$ of the corresponding user with the input reception signal 31 ($r_{(t)}$). The integrator 33 integrates outputs from the multiplier 32 to perform despreading. The transmission line estimator 34 extracts the transmission characteristics from the despread signal. At the same time, the transmission line estimator 34 measures a predetermined Eb/No (energy per signal bit/noise power spectrum density).

The reception characteristic comparison controller 311 is arranged according to the present invention. The reception characteristic comparison controller 311 compares the Eb/No value measured by the transmission line estimator 34 with the Eb/No value 210 obtained in the first preliminary demodulation stage. As a result of comparison, if it is determined that the actual characteristics are poorer than the estimated characteristics, the control signal 313 is output. The output control signals pass through the control lines (211 in FIG. 5) and are collected to the reception quality collector. After overall determination is complete, an appropriate control signal is generated and output to the AGC controller 19, thereby correcting the AGC.

An example of the control method of correcting the AGC in the AGC controller 19 is as follows.

First, the following factors are defined as follows:
(i) the (average) degree of improvement of the SIR is given as δdB;
(2) the threshold of the degree of improvement of the SIR is given as T dB; and
(3) the correction width of the AGC is given as ±D dB.
If δ>T, then no control is performed.
If 0<δ<T, then control is performed to slightly increase the signal level (D or less).
If δ<0, then control is performed to slightly decrease the signal level (−D or more).

As described above, the quality of the signal before each interference cancellation operation is compared with that after each interference cancellation operation. The degree of improvement of the reception characteristics upon the interference cancellation processing is measured. If it is determined that the measured degree of improvement is excessively low, AGC correction is performed to keep appropriate bit accuracy. This can prevent the conventional drawbacks in which the operation accuracy is poor and sufficient interference cancellation characteristics cannot be obtained.

This embodiment further has a BER (Bit Error Rate) measurement/comparison function for measuring the data error rate of a pilot symbol (PL). More specifically, the reception characteristic comparison controller 311 has a function of causing an PL BER measurement unit 312 to measure the error rate of the known symbol portion of a symbol pattern and compare it with the error rate measured in the first preliminary demodulation stage. The change in reception characteristics can be detected more precisely. This detection is combined with detection for degradation of the Eb/No to control the AGC level correction with a higher accuracy.

In the above embodiment, Eb/No detection is performed together with BER detection. However, either Eb/No detection or BER detection may be performed for control.

What is claimed is:

1. A gain circuit for use with a DS-CDMA (Direct Sequence-Code Division Multiple Access) multi-user interference canceller/demodulator unit for cancelling interference waves of a plurality of users, the circuit comprising;
    a variable gain amplifier; and
    a gain controller coupled to the variable gain amplifier;
    the interference canceller/demodulator unit comparing reception characteristics of reception signals received from the plurality of users prior to interference cancellation processing with reception characteristics after the interference cancellation processing and evaluating a comparison result, the gain controller controlling gains of the variable gain amplifier prior to interference canceller/demodulator unit processing of the reception signals so as to maximize improvements of the reception characteristics of the reception signals on the basis of an evaluation result.

2. The gain circuit according to claim 1, wherein an SN (Signal-to-Noise) ratio or an Eb/No (energy per signal bit/noise power spectrum density) and/or a BER (Bit Error Rate) are used as the reception characteristics to be compared and evaluated, and wherein SN ratio or Eb/No is controlled to be maximum, while the bit error rate is controlled to be minimum.

3. A circuit comprising:
a variable gain amplifier whose gain is controlled by a first control signal from an AGC controller; and
a DS-CDMA multi-user interference canceller/demodulator unit comprising: a preliminary demodulation section for obtaining, in advance, reception characteristics of reception signals received from a plurality of users prior to interference cancellation processing; and providing to respective subsequent interference cancellation stages of the obtained data;
a section for measuring and obtaining the reception characteristics of the reception signals for the respective interference cancellation stages after interference cancellation processing;
a section for comparing the reception characteristics of the respective interference cancellation stages after the interference cancellation processing with the reception characteristics prior to the interference cancellation processing; and
a reception quality collection section for collecting comparison results from all the interference cancellation stages when an interference canceller cancels interference, and generating a control signal for the AGC controller to correct the current gain of the variable gain amplifier.

4. The circuit according to claim 3, wherein after said reception quality collection section collects the comparison results in all the interference cancellation stages, a gain of said variable gain amplifier is so controlled as to optimize an average result of the comparison results.

5. A method for cancelling interference waves of a plurality of users to obtain a plurality of demodulated signals in a CDMA (Code Division Multiple Access) multi-user system the method comprising: comparing reception characteristics of reception signals received from a respective one of said plurality of users prior to interference cancellation processing with reception characteristics after interference cancellation processing;

evaluating comparison results generated from said comparing step;

and controlling gain of a variable gain amplifier prior to baseband decoding of the reception signals so as to maximize improvements of the reception characteristics of the reception signals on the basis of the evaluation of the comparison results.

6. The method according to claim 5, wherein an AGC controller generates a gain control signal for controlling the gain of said variable gain amplifier, wherein an SN (Signal-to-Noise) ratio or an Eb/No (energy per signal bit/noise power spectrum density) and/or a BER (Bit Error Rate) are used as the reception characteristics to be compared and evaluated, and wherein the SN ratio or Eb/No is controlled to be maximum, while the bit error rate is controlled to be minimum.

* * * * *